United States Patent [19]

Tigerholm

[11] Patent Number: 5,259,871
[45] Date of Patent: Nov. 9, 1993

[54] DEAERATION DEVICE FOR OIL-FIRED EQUIPMENT

[76] Inventor: Lars Tigerholm, Bromma Kyrkväg 446, 161 52 Bromma, Sweden

[21] Appl. No.: 904,664

[22] Filed: Jun. 26, 1992

[30] Foreign Application Priority Data

Jun. 28, 1991 [SE] Sweden .................. 9101999

[51] Int. Cl.$^5$ .............................. B01D 19/00
[52] U.S. Cl. ........................ 96/161; 96/166; 137/188; 137/202
[58] Field of Search .............. 55/165, 167, 168, 170; 137/173, 188, 202

[56] References Cited

U.S. PATENT DOCUMENTS 214,463  4/1879  Smith .................. 137/202
4,564,374  1/1986  Hofmann .................. 55/169
4,570,664  2/1986  Jonsson et al. .................. 137/202

FOREIGN PATENT DOCUMENTS 3904963  8/1990  Fed. Rep. of Germany .
341231  12/1971  Sweden .
441699  10/1985  Sweden .

Primary Examiner—Tim Miles
Attorney, Agent, or Firm—Walter Ottesen

[57] ABSTRACT

The invention is directed to a deaeration device for oil supply installations for oil-fired boilers and similar plant equipment. The deaeration device includes a deaeration valve and a float which is made to float even in severely foaming oil by partially supporting its weight on a spring element. This ensures that the float will close the deaeration valve and prevent oil leakage.

10 Claims, 4 Drawing Sheets

DEAERATION DEVICE FOR OIL-FIRED EQUIPMENT

FIELD OF THE INVENTION

The invention relates to a deaeration device for oil supply installations for oil-fired boilers and similar plant equipment in which the oil tank and pump are connected by a single pipe and in which a deaeration device is installed between the suction and delivery ends of the pump to remove air (the presence of which will cause foaming) entrained in the oil and/or to remove oil vapor, both of which will interfere with the proper operation of the oil burner.

BACKGROUND OF THE INVENTION

Previously known devices of this type, for example, that in accordance with Swedish Patent 341,231, show a deaeration chamber provided with a diaphragm valve actuated by pump pressure and arranged to interconnect the deaeration chamber and pump intake. The deaeration chamber is, furthermore, provided with a float-control valve which opens and closes the vent opening of the deaeration chamber to the atmosphere. If the air content of the oil is extremely high, resulting in severe foaming and a reduction in the density of the oil in the deaeration chamber, the oil will be unable to lift the float sufficiently to close the vent opening. As a result, oil foam will escape uncontrollably from the vent opening, resulting in oil leakage.

Other known devices in which the vent is opened and closed by a float also exhibit the same disadvantages under conditions of severe foaming. One such example is the device disclosed in U.S. Pat. No. 4,579,664, in which the float must possess a certain weight to close the oil outlet from the deaeration chamber.

SUMMARY OF THE INVENTION

It is an object of the invention to overcome the disadvantages of devices of the kind described above in a simple manner and to ensure closure of the vent even when foaming is severe thereby preventing oil leakage.

The deaeration device of the invention includes: a housing defining a deaeration chamber; the housing having an inlet communicating with the chamber and connected to an oil return pipe for passing the foaming oil into the chamber; valve means movable between a first position wherein the valve means is open to permit air entrained in the foaming oil to pass to the atmosphere and a second position wherein the deaeration chamber is closed with respect to the atmosphere; float means for floating upwardly as the level of oil rises in the deaeration chamber to actuate the valve means to move from the first position to the second position after a predetermined quantity of deaerated oil has accumulated in the deaeration chamber; and, resilient biasing means for resiliently biasing the float means so as to partly support the weight thereof and permit the float means to float and rise with the level of oil even in severely foaming oil.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
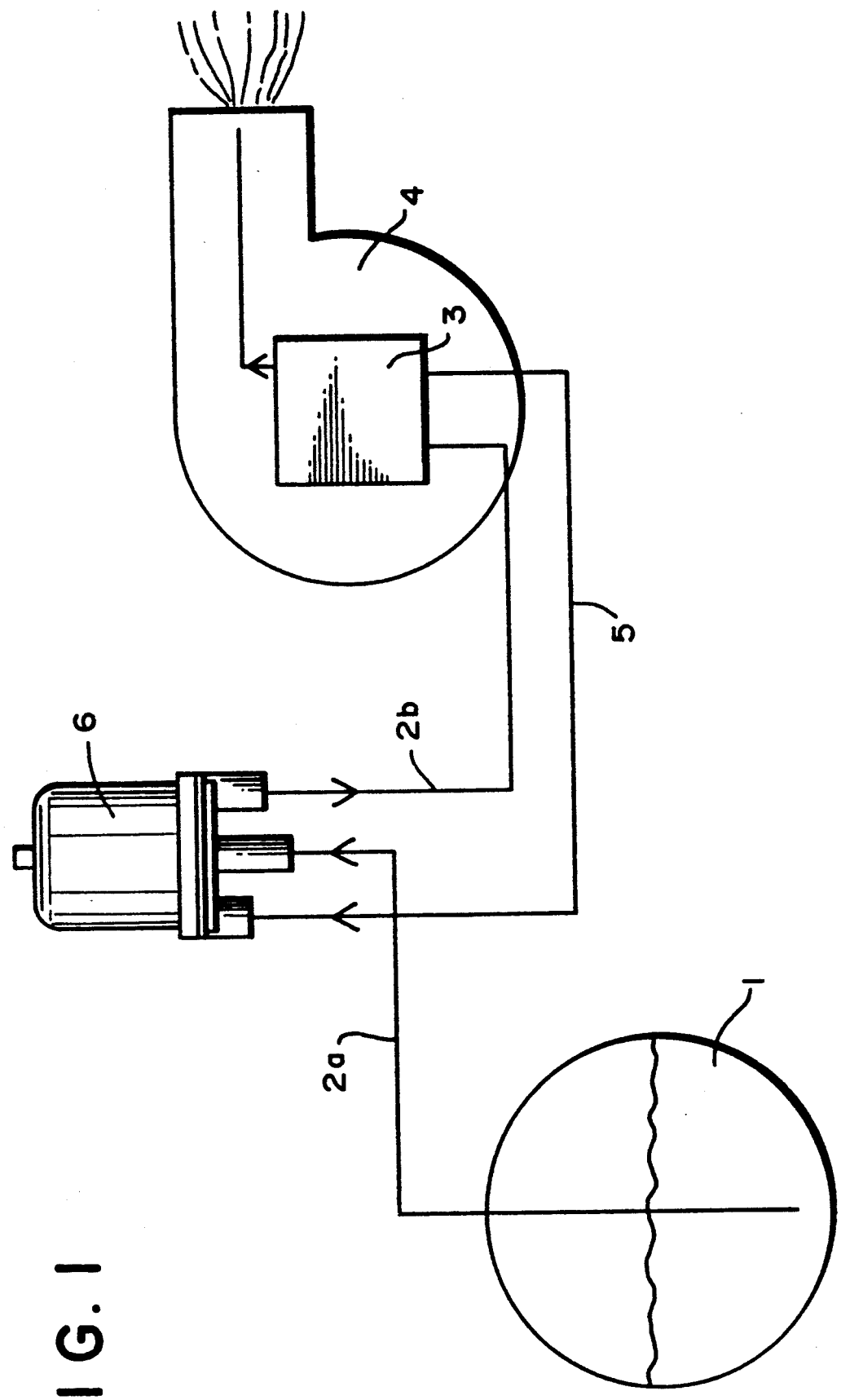
FIG. 1 is a schematic of an oil supply installation incorporating the deaeration device according to the invention.

In FIG. 1, reference numeral 1 identifies an oil tank, 2a a pipe connecting the tank with the deaeration device 6, and 2b a pipe connecting the deaeration device with a pump 3 comprising part of an oil burner 4. In oil burners, a substantial portion of the oil is not burned because the pump supplies more oil than the burner consumes. Accordingly, a pipe 5 returns excess oil from the pump to the deaeration device from where the deaerated oil is returned to the pump intake through pipe 2b.

The oil becomes entrained with air because of the suction action of the pump as well as because of additives which are added to the fuel oil.

Figure 2:
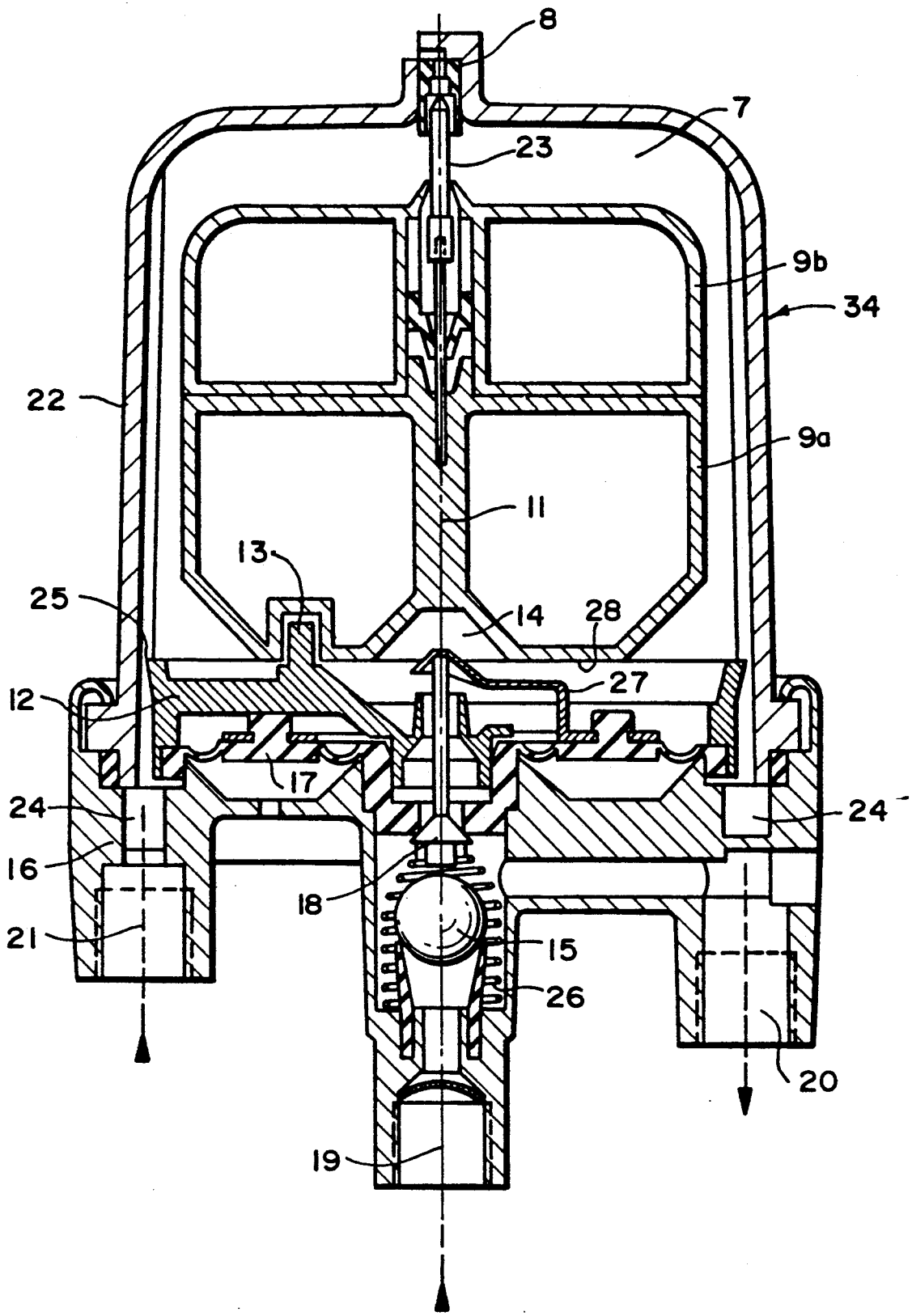
FIG. 2 is an elevation view, in section, of the deaeration device according to the invention.

The deaeration device shown in FIG. 2 includes a base 16 with a connection 19 for the supply pipe 2a from the tank, a connection 20 for the pump intake pipe 2b and a connection 21 for the excess oil return pipe 5. The base 16 is further provided with a check valve 15, which opens at a given partial pressure determined by the pump, but which prevents the return of oil to the tank. The base 16 is fitted with a cover 22 which encloses the deaeration chamber 7.

Reference numeral 24 identifies an annular channel into which the foaming oil enters from connection 21 and then passes into the deaeration chamber 7 through an annular gap 25 conjointly defined by the wall of cover 22 and bottom section 12. The bottom of the chamber 7 is closed by a diaphragm 17, which opens a valve element 18 at a given pressure in the chamber 7 and discharges oil from the chamber through connection 20. The spring 26 resiliently biases valve element 18 in the closed position.

The deaeration chamber 7 communicates with the atmosphere through the deaeration valve 8, through which air entrained in the oil is released until the oil level in the deaeration chamber has lifted floats 9a and 9b sufficiently for needle 23 to close the valve 8. Float 9b is guided radially by float 9a but is axially movable with respect to it and acts as a safety float to close the vent if, for example, float 9a should be filled with oil. Float 9a rests on the bottom section 12 of the deaeration chamber 7 and is guided radially by the studs 13 in the chamber for movement along axis 11. The bottom section 12 also holds the diaphragm 17 in position and acts as an attachment or guide for the spring element 10.

When the valve 8 is closed, the pressure in chamber 7 will increase and when this pressure reaches a predetermined level, then this pressure acting on diaphragm 17 will cause valve element 18 to overcome the resilient biasing force of spring 26 and open the valve causing oil to discharge from the chamber 7 into connection 20. The pressure acting on the diaphragm 17 is transmitted to valve element 18 by the arm 27 attached to the diaphragm.

The spring element 10 takes up part of the weight of the float (9a, 9b) by applying a resilient biasing force thereto. This enables the float to also float on very light (foaming) oil, that is, oil having a low specific weight because of entrained air.

Figure 3:
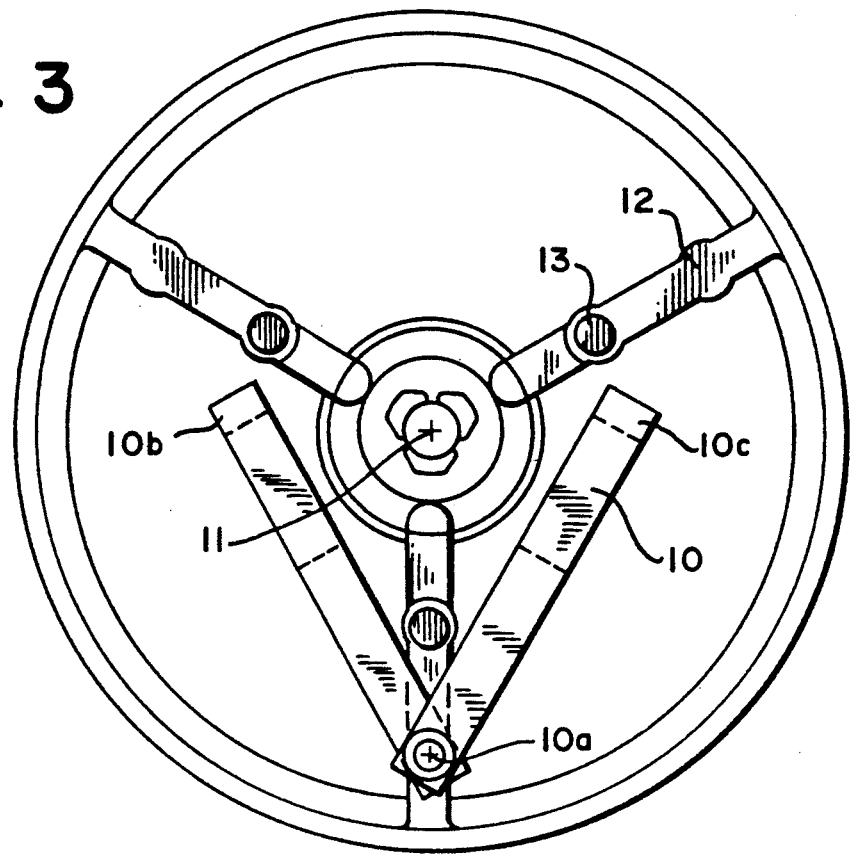
FIG. 3 is a horizontal section through the deaeration device of FIG. 2 showing the lower portion of the deaeration chamber in plan view and an embodiment of the spring element in accordance with a feature of the invention wherein the spring element is configured as a V-shaped leaf spring.

FIG. 3 is a plan view of the bottom section 12 of the deaeration chamber and shows a spring element in the form of a V-shaped leaf spring 10. Reference numeral 11 identifies the longitudinal axis of the floats (9a, 9b) and 13 the studs which guide float 9a radially and may also be used to guide other types of spring elements such as a coil spring as will be shown hereinafter.

Without the spring 10, oil would leak through the valve 8 if there is a large amount of air in the oil because then the float would not float upwardly to close the valve. The spring ensures that the float (9a, 9b) will float even in very foaming oil.

Referring again to FIG. 3, the V-shaped leaf spring 10 has an apex 10a which is attached to the bottom section 12. The free ends 10b and 10c of the leaf spring 10 support the weight of the floats (9a, 9b) at the base 28 of the float 9a at two diametrically opposite points in relation to the vertical axis 11 sufficiently to permit the floats (9a, 9b) to float in severely foaming oil.

The invention is not limited to the embodiment described above and shown in FIGS. 1 to 3. Thus, the type and location of the spring shown may be varied. For example, the leaf spring shown may be replaced by a wire spring, coil spring or other type of spring element arranged to actuate the lower float or the upper float only which acts as a safety float.

Figure 4:
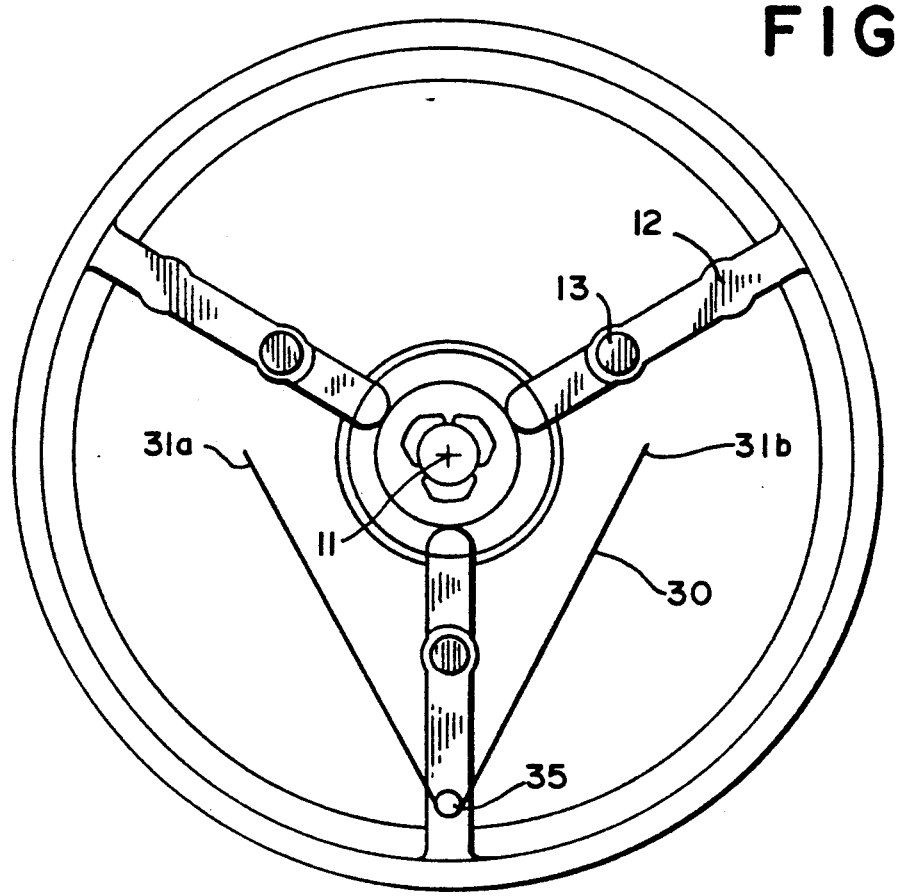
FIG. 4 is a view corresponding to FIG. 3 but wherein the spring element is a V-shaped wire spring.

FIG. 4 shows a V-shaped wire spring 30 arranged in the same manner as shown in FIG. 3. The spring 30 is made of bent piano wire and has free ends 31a and 31b which act on base 28 of the float 9a at two diametrically opposite points in relation to the vertical axis 11. The wire spring 30 is fixedly attached to base section 30 at location 35.

Figure 5A:
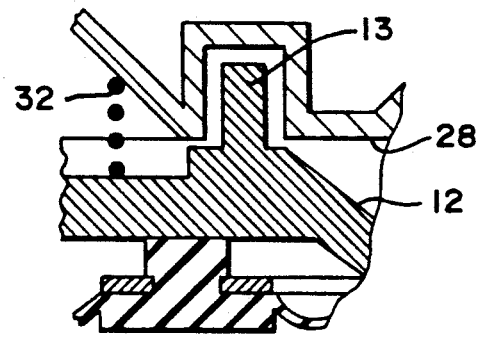
FIG. 5A is a detail view showing a portion of the float and the bottom section with a spring element in the form of a coil spring interposed therebetween according to another embodiment of the invention.
Figure 5B:
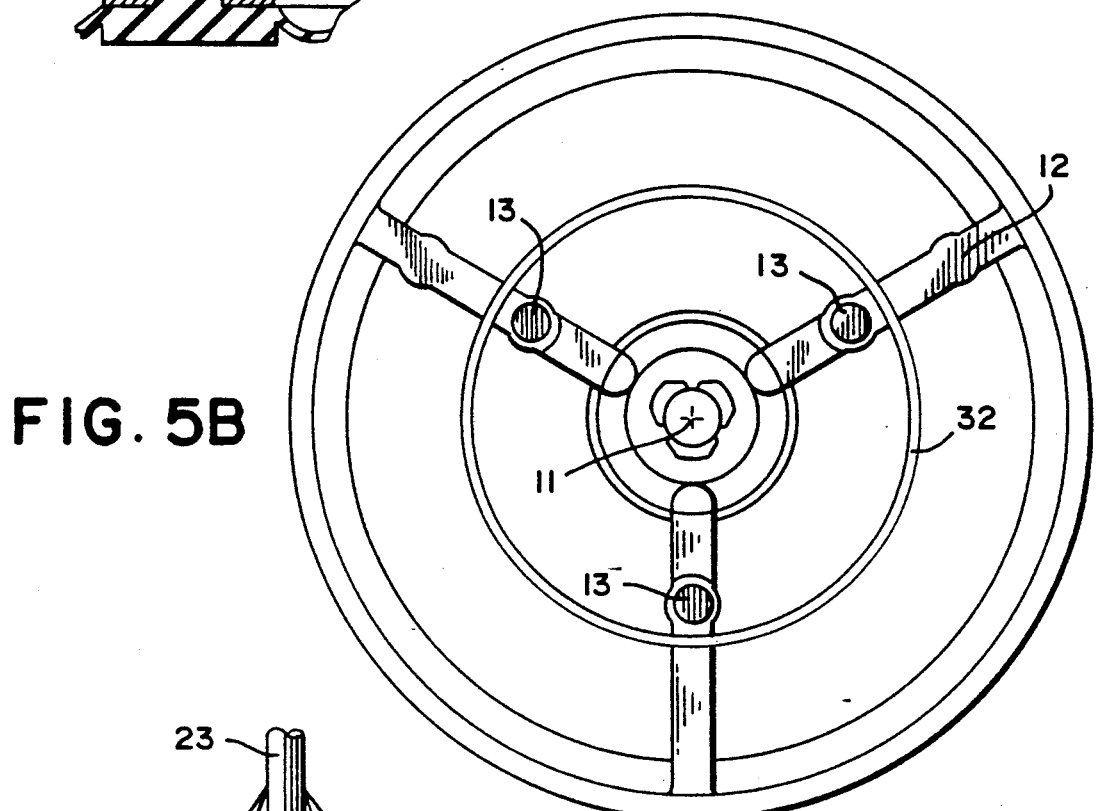
FIG. 5B is a plan view of the lower portion of the deaeration chamber and shows how the coil spring of FIG. 5A is held radially in position; and, FIG. 6 is a detail view of two floats one atop the other with a spring element in the form of a coil spring disposed therebetween.

According to another embodiment, the resilient biasing means can be a coil spring 32 arranged in the float housing 34 between the bottom section 12 thereof and the bottom wall 28 of the float 9a as shown in FIG. 5A. As shown in FIG. 5B, the coil spring 32 is located radially by studs 13. The coil spring 32 supports the floats (9a, 9b) sufficiently to permit them to float in severely foaming oil.

Figure 6:
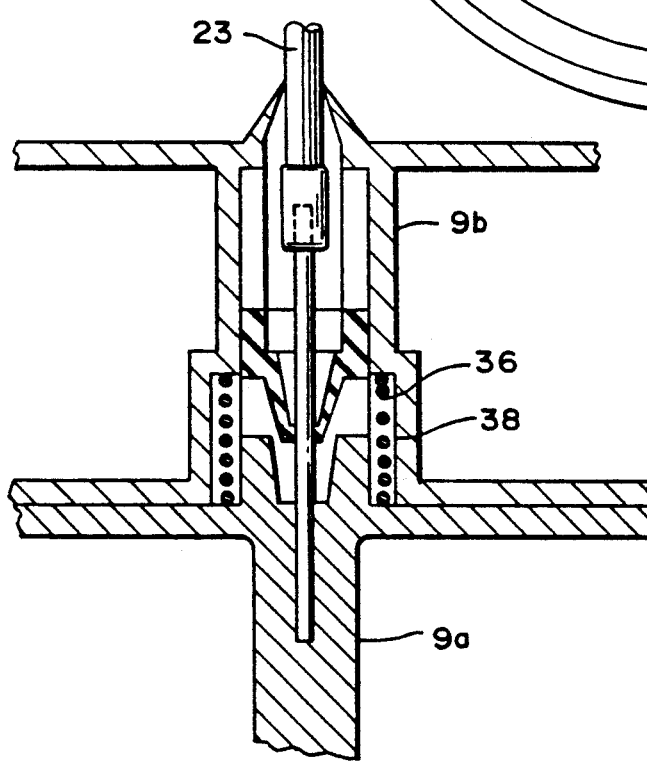

FIG. 6 shows another embodiment of the invention wherein the resilient biasing means is defined by a spiral spring 36 arranged centrally in the float housing and is disposed between the upper and lower floats (9b and 9a). The spring 36 is located radially by an annular recess 38 in the upper float 9b. The spring 36 supports the weight of the upper float 9b sufficiently to permit the same to float in severely foaming oil.

Furthermore, the application of the invention is not confined to oil supply installations, but may also be used to advantage in installations of other types in which foaming oil has an adverse influence on operation and reliability, as in diesel engine-powered, stationary power plants or diesel engine-driven vehicles.

It is understood that the foregoing description is that of the preferred embodiments of the invention and that various changes and modifications may be made thereto without departing from the spirit and scope of the invention as defined in the appended claims.

What is claimed is:

1. In an oil-fired installation including an oil tank, an oil supply line extending from the oil tank, a pump, a pump feed line supplying oil to the pump and an excess oil return pipe for conducting excess foaming oil away from said pump, and a deaeration device connected between the oil supply line and the pump feed line, the deaeration device comprising:

a housing having a base and defining a deaeration chamber;

said housing having an inlet communicating with said chamber and connected to said oil return pipe for passing the foaming oil into said chamber;

said housing having an outlet communicating with said chamber for discharging oil from said chamber into said pump feed line;

valve means movable between a first position wherein said valve means is open to permit air entrained in the foaming oil to pass to the atmosphere and a second position wherein said deaeration chamber is closed with respect to the atmosphere;

float means disposed in said chamber and above said base for floating upwardly as the level of oil rises in said deaeration chamber to actuate said valve means to move from said first position to said second position after a predetermined quantity of deaerated oil has accumulated in said deaeration chamber;

resilient biasing means interposed between said base and said float means for resiliently biasing said float means; and, said resilient biasing means being configured so as to partly support the weight of said float means and permit said float means to float and rise with said level even in severely foaming oil.

2. The deaeration device of claim 1, said housing including a base; said float means being a float defining a longitudinal axis and having a bottom wall; said resilient biasing means including a V-shaped wire spring having two wire spring arms joined at a common apex fixedly attached to said base; and, said wire spring arms having respective free ends in contact engagement with said bottom wall at respective diametrically opposite points relative to said longitudinal axis.

3. The deaeration device of claim 1, said housing including a base having a plurality of studs formed thereon; said float means being a float having a bottom wall; and, said resilient biasing means including a coil spring radially supported by said studs, respectively; and, said coil spring being interposed between said bottom wall and said base.

4. The deaeration device of claim 1, said float means including two floats one atop the other so as to define a separable interface therebetween; and, said resilient biasing means being a coil spring interposed between said floats at said separable interface.

5. In an oil-fired installation including an oil tank, an oil supply line extending from the oil tank, a pump, a pump feed line supplying oil to the pump and an excess oil return pipe for conducting excess foaming oil away from said pump, and a deaeration device connected between the oil supply line and the pump feed line, the deaeration device comprising:

a housing having a base and defining a deaeration chamber;

said housing having an inlet communicating with said chamber and corrected to said oil return pipe for passing the foaming oil into said chamber;

said housing having an outlet communicating with said chamber for discharging oil from said chamber into said pump feed line;

valve means movable between a first position wherein said valve means is open to permit air entrained in the foaming oil to pass to the atmosphere and a second position wherein said deaeration chamber is closed with respect to the atmosphere;

float means disposed in said chamber and above said base for floating upwardly as the level of oil rises in said deaeration chamber to actuate said valve means to move from said first position to said second position after a predetermined quantity of deaerated oil has accumulated in said deaeration chamber;

resilient biasing means interposed between said base and said float means for resiliently biasing said float means so as to partly support the weight thereof and permit said float means to float and rise with said level even in severely foaming oil;

said float means being a float defining a longitudinal axis and having a bottom wall;

said resiliently biasing means including a V-shaped leaf spring having two leaf spring arms joined at a common apex fixedly attached to said base; and, said leaf spring arms having respective free ends in contact engagement with said bottom wall at respective diametrically opposite points relative to said longitudinal axis.

6. A deaeration device comprising:

a housing having a base and defining a deaeration chamber;

said housing having an inlet for receiving aerated oil and being disposed in said housing so as to communicate with said chamber for passing the aerated oil into said chamber;

said housing having an outlet communicating with said chamber for discharging oil from said chamber;

valve means movable between a first position wherein said valve means is open to permit air entrained in the aerated oil to pass to the atmosphere and a second position wherein said deaeration chamber is closed with respect to the atmosphere;

float means disposed in said chamber and above said base for floating upwardly as the level of oil rises in said deaeration chamber to actuate said valve means to move from said first position to said second position after a predetermined quantity of deaerated oil has accumulated in said deaeration chamber;

resilient biasing means interposed between said base and said float means for resiliently biasing said float means; and, said resilient biasing means being configured so as to partly support the weight of said float means and permit said float means to float and rise with said level even in severely foaming oil.

7. The deaeration device of claim 6, said housing including a base; said float means being a float defining a longitudinal axis and having a bottom wall; said resilient biasing means including a V-shaped wire spring having two wire spring arms joined at a common apex fixedly attached to said base; and, said wire spring arms having respective free ends in contact engagement with said bottom wall at respective diametrically opposite points relative to said longitudinal axis.

8. The deaeration device of claim 6, said housing including a base having a plurality of studs formed thereon; said float means being a float having a bottom wall; and, said resilient biasing means including a coil spring radially supported by said studs, respectively; and, said coil spring being interposed between said bottom wall and said base.

9. The deaeration device of claim 6, said float means including two floats one atop the other so as to define a separable interface therebetween; and, said resilient biasing means being a coil spring interposed between said floats at said separable interface.

10. A deaeration device comprising:

a housing having a base and defining a deaeration chamber;

said housing having an inlet for receiving aerated oil and being disposed in said housing so as to communicate with said chamber for passing the aerated oil into said chamber;

said housing having an outlet communicating with said chamber for discharging oil from said chamber;

valve means movable between a first position wherein said valve means is open to permit air entrained in the aerated oil to pass to the atmosphere and a second position wherein said deaeration chamber is closed with respect to the atmosphere;

float means disposed in said chamber and above said base for floating upwardly as the level of oil rises in said deaeration chamber to actuate said valve means to move from said first position to said second position after a predetermined quantity of deaerated oil has accumulated in said deaeration chamber;

resilient biasing means interposed between said base and said float means for resiliently biasing said float means so as to partly support the weight thereof and permit said float means to float and rise with said level even in severely foaming oil;

said float means being a float defining a longitudinal axis and having a bottom wall;

said resilient biasing means including a V-shaped leaf spring having two leaf spring arms joined at a common apex fixedly attached to said base; and, said leaf spring arms having respective free ends in contact engagement with said bottom wall at respective diametrically opposite points relative to said longitudinal axis.

* * * * *

UNITED STATES PATENT AND TRADEMARK OFFICE
CERTIFICATE OF CORRECTION

PATENT NO. : 5,259,871

DATED : November 9, 1993

INVENTOR(S) : Lars Tigerholm

It is certified that error appears in the above-identified patent and that said Letters Patent is hereby corrected as shown below:

In column 1, line 35: delete "4,579,664" and substitute -- 4,570,664 -- therefor.

In column 5, line 7: delete "corrected" and substitute -- connected -- therefor.

In column 5, line 35: delete "resiliently" and substitute -- resilient -- therefor.

Signed and Sealed this

Twenty-sixth Day of April, 1994

*Attest:*

BRUCE LEHMAN

*Attesting Officer*  *Commissioner of Patents and Trademarks*